United States Patent
Yang et al.

(10) Patent No.: US 10,282,601 B2
(45) Date of Patent: May 7, 2019

(54) ELECTRONIC DEVICE AND GESTURE RECOGNITION METHOD APPLIED THEREIN

(71) Applicant: HON HAI PRECISION INDUSTRY CO., LTD., New Taipei (TW)

(72) Inventors: Jung-Hao Yang, New Taipei (TW); Tung-Tso Tsai, New Taipei (TW); Chih-Yuan Chuang, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/652,698

(22) Filed: Jul. 18, 2017

(65) Prior Publication Data

US 2018/0373927 A1     Dec. 27, 2018

(30) Foreign Application Priority Data

Jun. 21, 2017   (TW) .............................. 106120799 A (51) Int. Cl.
*G06K 9/62*     (2006.01)
*G06K 9/46*     (2006.01)
(Continued)

(52) U.S. Cl.
CPC ........... *G06K 9/00355* (2013.01); *G06K 9/40* (2013.01); *G06K 9/4642* (2013.01);
(Continued)

(58) Field of Classification Search
CPC ........... G06K 9/00335; G06K 9/00355; G06K 9/6255; G06K 9/4642; G06K 9/40;
(Continued)

(56) References Cited

U.S. PATENT DOCUMENTS

| 2011/0291926 | A1* | 12/2011 | Gokturk | ................. G06F 3/017 |
|---|---|---|---|---|
| | | | | 345/158 |
| 2012/0093360 | A1* | 4/2012 | Subramanian | ..... G06K 9/00201 |
| | | | | 382/103 |

(Continued)

FOREIGN PATENT DOCUMENTS

| TW | 201426413 A | 7/2014 |
|---|---|---|
| TW | 201619752 A | 6/2016 |

*Primary Examiner* — Jon Chang
(74) *Attorney, Agent, or Firm* — ScienBiziP, P.C.

(57) ABSTRACT

An electronic device, which can recognize and be controlled by a gesture of a hand, obtains an image that comprises the hand and image depth levels of objects within the image. Static objects are filtered from the image. A first establishing module obtains hand coordinate information and establishes a first block comprising the hand. Modules further obtain a depth level of each pixel of the first block and counts the number of pixels of each depth level. A second establishing module obtains hand depth information according to the counting result and establishes a second block including the hand. A recognizing module detects a moving track of the hand in the second block and recognizes a gesture of the hand according to a library of gestures. A gesture recognition method is also provided.

18 Claims, 6 Drawing Sheets

(51) Int. Cl.
*G06K 9/40* (2006.01)
*G06T 7/55* (2017.01)
*G06F 3/01* (2006.01)
*G06K 9/00* (2006.01)
*G06T 7/223* (2017.01)

(52) U.S. Cl.
CPC ............ *G06K 9/6255* (2013.01); *G06T 7/223* (2017.01); *G06T 7/55* (2017.01); *G06F 3/017* (2013.01); *G06T 2207/10024* (2013.01); *G06T 2207/10028* (2013.01); *G06T 2207/20072* (2013.01); *G06T 2207/20081* (2013.01); *G06T 2207/30196* (2013.01); *G06T 2207/30241* (2013.01)

(58) Field of Classification Search
CPC . G06F 3/017; G06T 7/55; G06T 7/223; G06T 2207/20081; G06T 2207/10028; G06T 2207/30196; G06T 2207/10024; G06T 2207/20072; G06T 2207/30241
See application file for complete search history.

(56) References Cited

U.S. PATENT DOCUMENTS

| | | | |
|---|---|---|---|
| 2013/0278504 A1* | 10/2013 | Tong | G06K 9/00355 345/158 |
| 2014/0177909 A1* | 6/2014 | Lin | G06F 19/00 382/103 |
| 2017/0090584 A1* | 3/2017 | Tang | G06F 3/017 |

* cited by examiner

ELECTRONIC DEVICE AND GESTURE RECOGNITION METHOD APPLIED THEREIN

FIELD

The subject matter herein generally relates to controlling of electronic devices and related gesture recognition.

BACKGROUND

Many electronic devices support gesture recognition. In a current gesture recognition system, when the gesture recognition system of a electronic device establishes a detection block to detect and recognize a gesture of a hand, the established detection block may comprise one or more other objects (wall, human head, etc.). If such objects are not filtered from the detection block, the recognition precision of the gesture recognition system can be affected.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
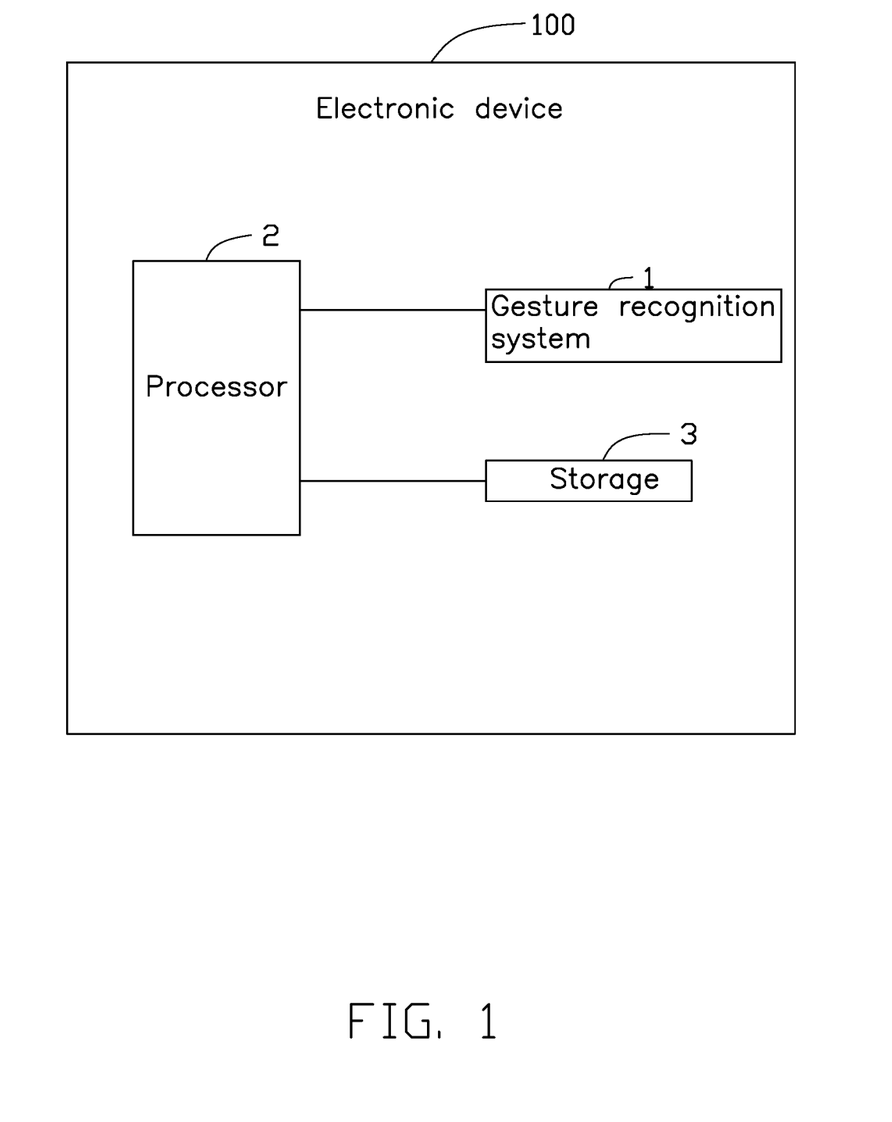
FIG. 1 is a block diagram of an exemplary embodiment of an electronic device.

FIG. 1 illustrates an electronic device 100 in accordance with an exemplary embodiment.

The electronic device 100 comprises a gesture recognition system 1, at least one processor 2, and at least one storage 3. The gesture recognition system 1 detects and recognizes a gesture to control the electronic device 100.

In one exemplary embodiment, the gesture recognition system 1 can be stored in the storage 3.

Figure 2:
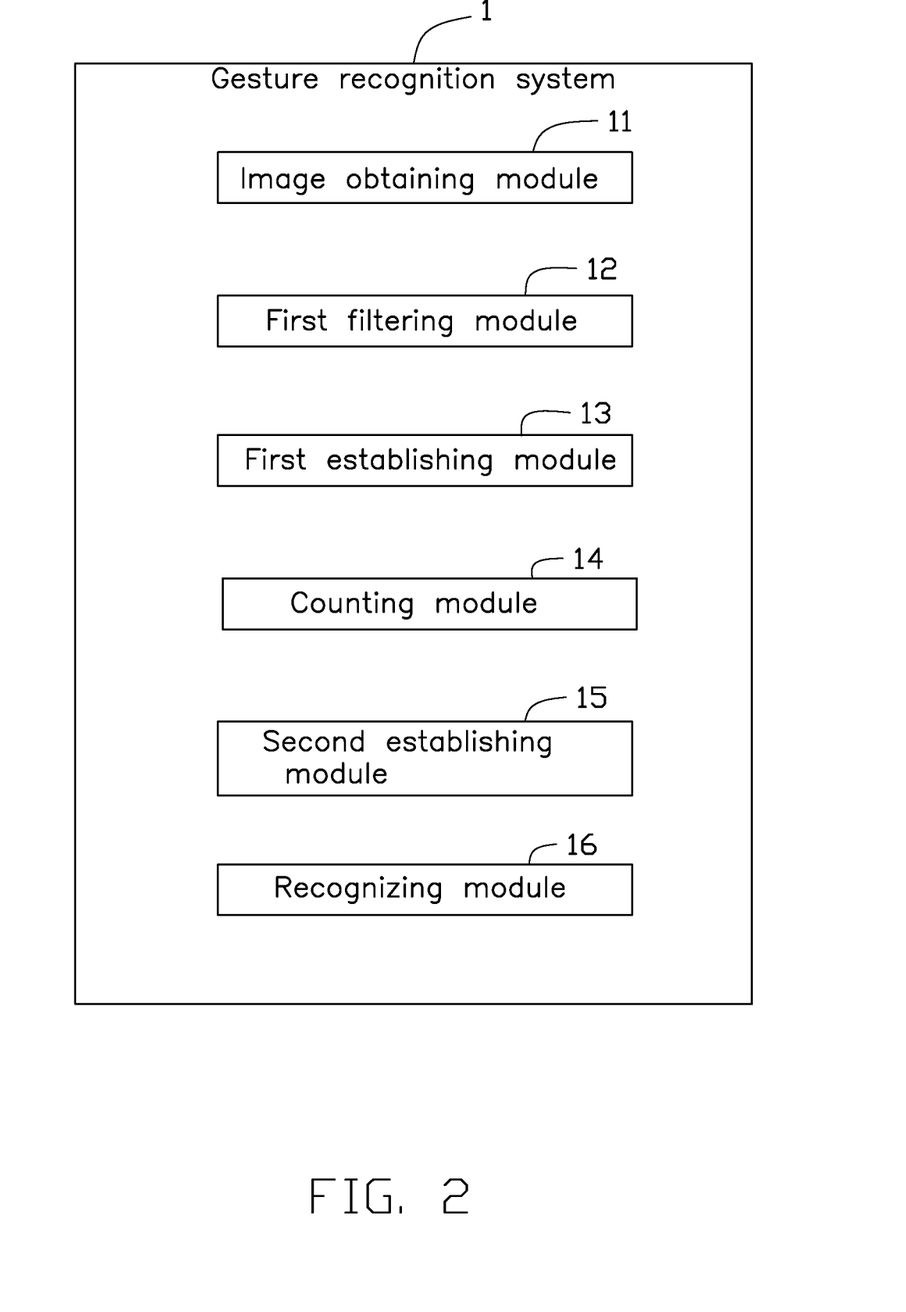
FIG. 2 is a block diagram of an exemplary embodiment of a gesture recognition system of the electronic device of FIG. 1.

Referring to FIG. 2, the gesture recognition system 1 can comprise a plurality of modules, such as an image obtaining module 11, a first filtering module 12, a first establishing module 13, a counting module 14, a second establishing module 15, and a recognizing module 16. The modules 11-16 can comprise one or more software programs in the form of computerized codes stored in the storage 3. The computerized codes can include instructions that can be executed by the processor 2 to provide functions for the modules 11-16.

The image obtaining module 11 obtains an image. The first filtering module 12 filters static objects comprised in the image.

In one exemplary embodiment, the image obtaining module 11 can enable a depth camera 4 (shown in FIG. 3) to capture the image. The depth camera 4 can obtain image depth information. The image can include red, green, and blue (RGB) colors and the image can comprise one or more objects.

In one exemplary embodiment, the image comprises at least one frame. Each pixel of each frame can be represented by an XY-coordinate, and depth information of each pixel can be represented by a Z-coordinate.

In one exemplary embodiment, the image comprises one or more static objects and one or more objects in motion. The first filtering module 12 can filter the static objects comprised by the image through a Gaussian mixture model (GMM) to retain the motion objects. The static objects can be a wall, a table, a chair, and a sofa, for example. The motion objects can be a hand, a head, and a body, for example.

Figure 3:
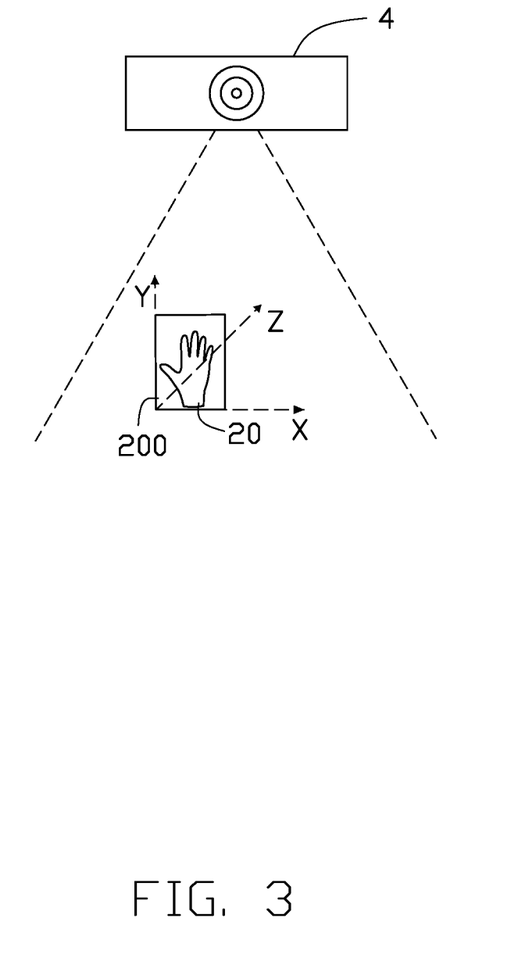
FIG. 3 is a diagram of an exemplary embodiment of a first block established by a first establishing module of the system of FIG. 2.

The first establishing module 13 obtains hand coordinate information and establishes a first block 200 comprising the hand 20. FIG. 3 shows the first block 200.

In one exemplary embodiment, the first establishing module 13 can locate the hand coordinate information through a deep learning algorithm after the first filtering module 12 filters out the static objects. The first establishing module 13 establishes characteristic values of the hand 20 through the deep learning algorithm and obtains the hand coordinate information. Then, the first establishing module can establish the first block 200 according to the hand coordinate information.

In one exemplary embodiment, the deep learning algorithm is an application to learning tasks of artificial neural networks (ANNs) that contain more than one hidden layers and the deep learning algorithm is part of a broader family of machine learning methods based on learning data representations.

In one exemplary embodiment, a percentage of an area of the hand 20 in a total area of the first block 200 being greater than a predetermined percentage value improves a recognition speed of the gesture recognition system 1. For example, the predetermined percentage value can be forty percent.

The counting module 14 obtains depth information of each pixel of the first block 200 and counts the number of pixels of each depth level.

In one exemplary embodiment, the first block 200 comprises a plurality of pixels, each pixel also can be represented by an XY-coordinate, and depth information of each pixel also can be represented by a Z-coordinate. The counting module 14 can search coordinate information of each pixel of the first block 200 to obtain the depth information of each pixel. Then, the counting module 14 can further count the number of pixels of each depth level through a histogram (as shown in FIG. 4).

Figure 4:
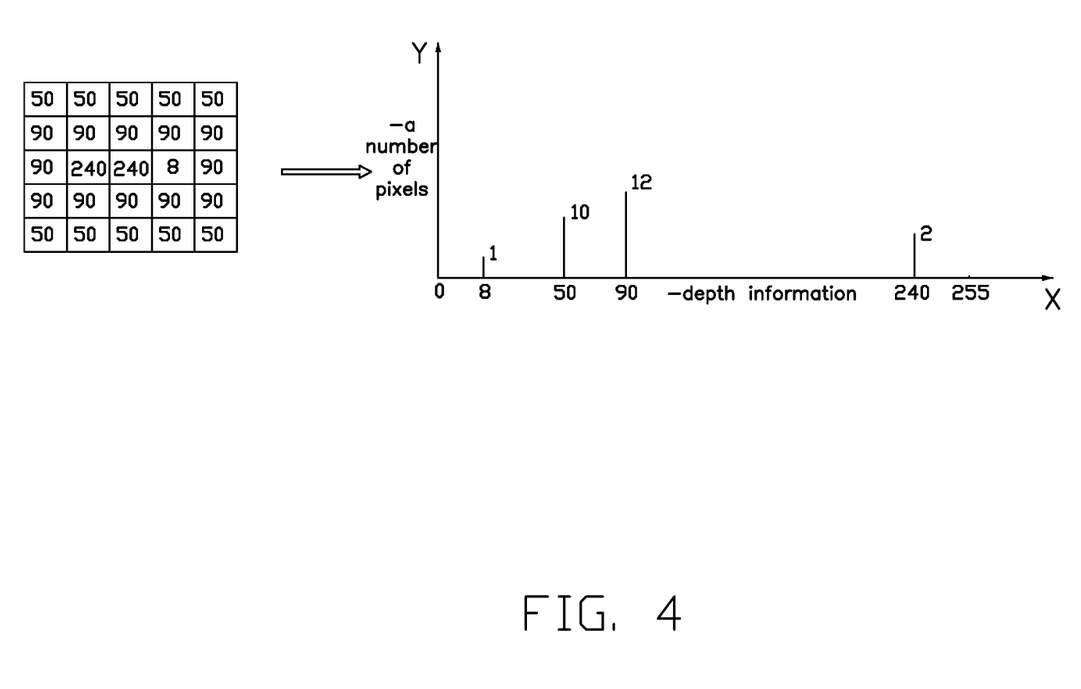
FIG. 4 is a diagram of an exemplary embodiment of a histogram to count pixels of the first block of FIG. 3.

Referring to FIG. 4, for example, the first block 200 is a 5 by 5 (i.e., 5*5) block and comprises twenty-five pixels. Each pixel comprises a depth information, and a range of the depth levels is 0-255. An X-coordinate of the histogram represents a depth information and a Y-coordinate of the histogram represents a number of first pixels of a depth level. According to FIG. 4, a first depth level (e.g., a depth value or level of 50) comprises ten pixels, a second depth level (e.g., a depth value or level of 90) comprises twelve pixels, a third depth level (e.g., a depth value or level of 240) comprises two pixels, and a fourth depth level (e.g., a depth value or level of 8) has only one pixel.

The second establishing module 15 obtains hand depth information according to a counting result and establishes a second block 300 (shown in FIG. 5) based on the hand depth information.

In one exemplary embodiment, the second establishing module 15 can obtain hand depth information according to a counting result of the histogram. If a depth value of a first pixel is less than a predetermined depth value, the first pixel can be recognized as a noise pixel. Then, the first pixel can be filtered from the histogram. In this exemplary embodiment, the predetermined value is 10 by way of example.

The fourth depth level is less than the predetermined depth value (e.g., 8<10), thus the second establishing module 15 filters the fourth depth information from the histogram. Then, an updated histogram only comprises first, second, and third depth levels. The second establishing module 15 extracts two depth levels from the updated histogram, where the two depth levels comprise the top two most numbers of pixels. The second establishing module 15 further selects a smaller value depth level from the two depth levels as the hand depth information for establishing the second block 300.

According to FIG. 4, the second depth level comprises the most pixels and the first depth level comprises the second most pixels. The second establishing module 15 extracts the first depth level and the second depth level from the histogram. Since a pixel value of the first depth level is less than a pixel value of the second depth (e.g., 50<90), the second establishing module 15 selects the first depth level as representing the hand depth information, to establish the second block 300. Then, a value of the hand depth information is 50.

Figure 5:
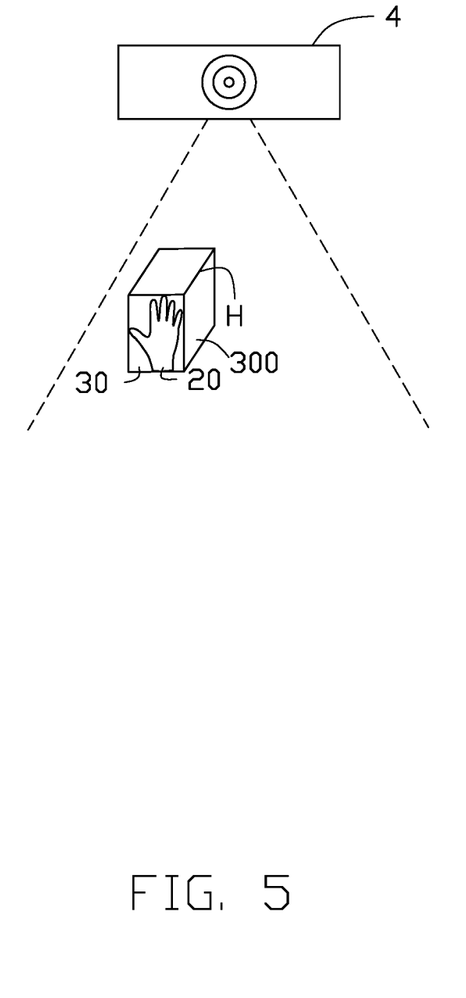
FIG. 5 is a diagram of an exemplary embodiment of a second block established by a second establishing module of the system of FIG. 2.

In one exemplary embodiment, the second establishing module 15 further filters other motion objects (head, body for example) from the first block 200 to retain only the hand 20. The second establishing module 15 establishes a depth level range according to the hand depth information. The depth level range can be 48-52, for example. The second establishing module 15 filters second pixels from the first block 200 which are not within the depth level range. Then, the second establishing module 15 can generate a planar block 30 comprising the hand 20 and further establish the second block 300 based on the planar block 30 and the hand depth information (In FIG. 5, "H" represents the hand depth information). The second block 300 is shown in FIG. 5.

The recognizing module 16 detects a moving track of the hand 20 in the second block 300 and recognizes a gesture of the hand 20 according to the moving track.

In one exemplary embodiment, the storage 3 can store a gesture library. In the gesture library, different moving tracks correspond to different gestures. The recognizing module 16 can recognize the gesture of the hand 20 according to the detected moving track and the gesture library. The recognizing module 16 further can update the gesture library through the deep learning algorithm.

Figure 6:
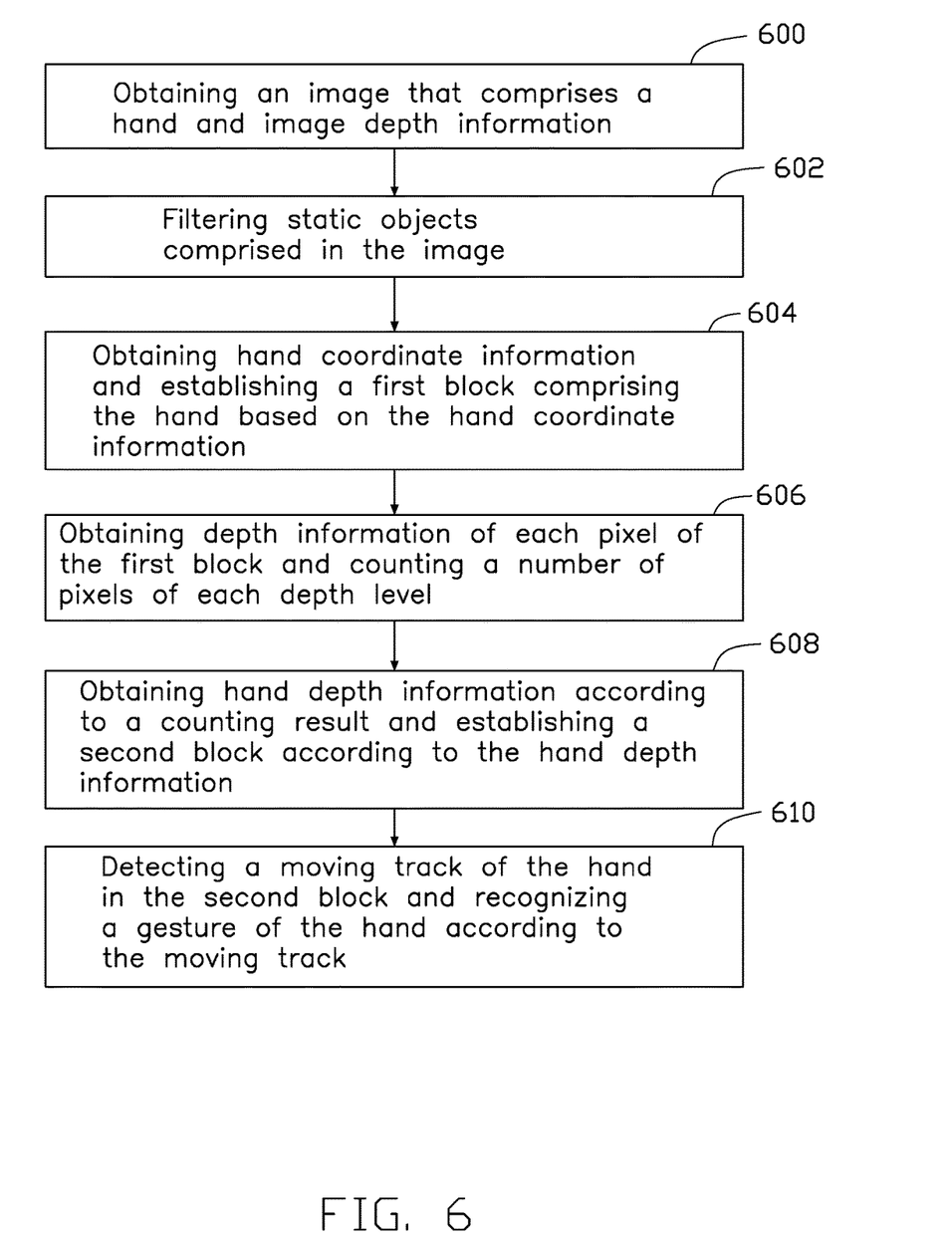
FIG. 6 is a flow diagram of an exemplary embodiment of a gesture recognition method applied in the electronic device of FIG. 1.

FIG. 6 illustrates one exemplary embodiment of a gesture recognition method of the electronic device 100. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 6 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 600.

In step 600, the image obtaining module 11 obtains an image that comprises the hand 20 and image depth information.

In step 602, the first filtering module 12 filters static objects comprised in the image.

In step 604, the first establishing module 13 obtains hand coordinate information and establishes the first block 200 comprising the hand 20 according to the hand coordinate information.

In step 606, the counting module 14 obtains depth information of each pixel of the first block 200 and counts a number of pixels of each depth level.

In step 608, the second establishing module 15 obtains hand depth information according to a counting result and establishes the second block 300 based on the hand depth information.

In step 610, the recognizing module 16 detects a moving track of the hand 20 in the second block 300 and recognizes a gesture of the hand 20 according to the moving track.

In one exemplary embodiment, the image obtaining module 11 can enable the depth camera 4 to capture the image. The depth camera 4 can obtain the image depth information and the image can be a RGB colors image.

In one exemplary embodiment, the first filtering module 12 can filter the static objects comprised in the image through the GMM.

In one exemplary embodiment, the first establishing module 13 can locate the hand coordinate information through a deep learning algorithm after the first filtering module 12 filters out the static objects. The first establishing module 13 establishes characteristic values of the hand 20 through the deep learning algorithm and obtains the hand coordinate information according to the characteristic values. Then, the first establishing module can establish the first block 200 according to the hand coordinate information.

In one exemplary embodiment, the counting module 14 can search coordinate information of each pixel of the first block 200 to obtain the depth information of each pixel.

Then, the counting module 14 can further count the number of pixels of each depth level through a histogram.

In one exemplary embodiment, the second establishing module 15 can obtain hand depth information according to a counting result of the histogram. If a depth value of a first pixel is less than a predetermined depth value, the first pixel can be recognized as a noise pixel. Then, the first pixel can be filtered out from the histogram.

In one exemplary embodiment, the second establishing module 15 extracts two depth levels from the updated histogram that the two depth levels comprise the most pixels. The second establishing module 15 further selects a smaller value depth level from the two depth levels as the hand depth information to establish the second block 300.

In one exemplary embodiment, the second establishing module 15 establishes a depth level range according to the hand depth information. The second establishing module 15 filters second pixels from the first block 200 which are not within the depth information range. Then, the second establishing module 15 can generate the planar block 30 comprising the hand 20 and establish the second block 300 according to the planar block 30 and the hand depth information.

In one exemplary embodiment, the storage 3 can store a gesture library. The recognizing module 16 can recognize the gesture of the hand 20 according to the detected moving track and the gesture library. The recognizing module 16 further can update the gesture library through the deep learning algorithm.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A gesture recognition method comprising:
    obtaining an image that comprises a hand and image depth information;
    filtering static objects which are comprised in the image;
    obtaining hand coordinate information and establishing a first block comprising the hand based on the hand coordinate information;
    obtaining depth information of each pixel of the first block and counting a number of pixels of each depth level;
    obtaining hand depth information according to a counting result and establishing a second block according to the hand depth information; and
    detecting a moving track of the hand in the second block and recognizing a gesture of the hand according to the moving track.

2. The gesture recognition method of claim 1, wherein the image is a red, green, and blue (RGB) colors image and the image comprises at least one object.

3. The gesture recognition method of claim 1, wherein the step of filtering the static objects comprised in the image comprises:
    filtering the static objects comprised in the image through a Gaussian mixture model (GMM).

4. The gesture recognition method of claim 1, wherein the step of obtaining the hand coordinate information and establishing the first block comprising the hand according to the hand coordinate information comprises:
    establishing characteristic values of the hand through a deep learning algorithm;
    obtaining the hand coordinate information according to the characteristic values; and
    establishing the first block comprising the hand according to the hand coordinate information.

5. The gesture recognition method of claim 4, wherein a percentage of an area of the hand in a total area of the first block is greater than a predetermined percentage value.

6. The gesture recognition method of claim 4, wherein the step of obtaining the depth information of each pixel of the first block and counting the number of pixels of each depth level comprises:
    extracting the depth information of each pixel of the first block according to the coordinate information of each pixel; and
    counting the number of pixels of each depth level through a histogram.

7. The gesture recognition method of claim 6, wherein the step of obtaining the hand depth information according to the counting result and establishing the second block according to the hand depth information comprises:
    filtering first pixels from the histogram that depth level of each first pixel is less than a predetermined depth value;
    extracting two depth levels from the histogram, wherein the two depth levels comprise top two most numbers of pixels; and
    selecting a smaller value depth level from the two depth levels as the hand depth information to establish the second block.

8. The gesture recognition method of claim 7, wherein the step of establishing the second block according to the hand depth information comprises:
    establishing a depth level range according to the hand depth information;
    filter second pixels from the first block which are not within the depth level range;
    generating a planar block comprising the hand according a filtered result; and
    establishing the second block according to the planar block and the hand depth information.

9. The gesture recognition method of claim 1, wherein the step of recognizing the gesture of the hand according to the moving track comprises:
    establishing a gesture library through a deep learning algorithm; and
    recognizing the gesture of the hand according to the moving track and the gesture library.

10. An electronic device comprising:
    at least one storage configured to store a plurality of modules, the plurality of modules being a collection of instructions of an application operable in the device;
    at least one processor configured to execute the plurality of modules, the modules comprising:
        an image obtaining module obtaining an image that comprises a hand and image depth information;
        a first filtering module filtering static objects which are comprised in the image;
        a first establishing module obtaining hand coordinate information and establishing a first block comprising the hand according to the hand coordinate information;

a counting module obtaining depth information of each pixel of the first block and counting a number of pixels of each depth level;

a second establishing module obtaining hand depth information according to a counting result and establishing a second block according to the hand depth information; and a recognizing module detecting a moving track of the hand in the second block and recognizing a gesture of the hand according to the moving track.

11. The electronic device of claim 10, wherein the image is a RGB colors image and the image comprises at least one object.

12. The electronic device of claim 10, wherein the first filtering module filters the static objects comprised in the image through a GMM.

13. The electronic device of claim 10, wherein the first establishing module establishes characteristic values of the hand through a deep learning algorithm and obtains the hand coordinate information according to the characteristic values, the first establishing module further establishes the first block comprising the hand according to the hand coordinate information.

14. The electronic device of claim 13, wherein a percentage of an area of the hand in a total area of the first block is greater than a predetermined percentage value.

15. The electronic device of claim 13, wherein the counting module extracts the depth information of each pixel of the first block according to the coordinate information of each pixel and counts the number of pixels of each depth level through a histogram.

16. The electronic device of claim 15, wherein the second establishing module filters first pixels from the histogram that depth information of each first pixel is less than a predetermined depth value and extracts two depth levels from the histogram, wherein the two depth information comprise top two most numbers of pixels, the second establishing module further selects a smaller value depth level from the two depth levels as the hand depth information to establish the second block.

17. The electronic device of claim 16, wherein the second establishing module establishes a depth level range according to the hand depth information and filters second pixels from the first block which are not within the depth information range, the second establishing module further generates a planar block comprising the hand according a filtered result and establishes the second block according to the planar block and the hand depth information.

18. The electronic device of claim 10, wherein the recognizing module establishes a gesture library through a deep learning algorithm and recognizes the gesture of the hand according to the moving track and the gesture library.

* * * * *